United States Patent
De Carney

(10) Patent No.: US 9,531,872 B2
(45) Date of Patent: Dec. 27, 2016

(54) COMMUNICATION APPARATUS FOR PROVIDING AN INDICATION ABOUT A MISSED CALL, AND METHOD THEREOF

(75) Inventor: Carolina De Carney, Panama (PA)

(73) Assignee: NAXOS FINANCE SA, Luxembourg (LU)

(*) Notice: Subject to any disclaimer, the term of this patent is extended or adjusted under 35 U.S.C. 154(b) by 358 days.

(21) Appl. No.: 13/811,195

(22) PCT Filed: Jul. 21, 2010

(86) PCT No.: PCT/EP2010/060585
§ 371 (c)(1),
(2), (4) Date: Apr. 18, 2013

(87) PCT Pub. No.: WO2012/010204
PCT Pub. Date: Jan. 26, 2012

(65) Prior Publication Data
US 2013/0203395 A1    Aug. 8, 2013

(51) Int. Cl.
*H04M 3/42* (2006.01)
*H04M 11/04* (2006.01)
*H04M 1/725* (2006.01)

(52) U.S. Cl.
CPC ..... *H04M 3/42195* (2013.01); *H04M 1/72519* (2013.01); *H04M 2250/60* (2013.01)

(58) Field of Classification Search
CPC .... H04M 1/56; H04M 1/575; H04M 1/72583; H04M 1/72522
See application file for complete search history.

(56) References Cited

U.S. PATENT DOCUMENTS

| | | | |
|---|---|---|---|
| 6,332,073 B1* | 12/2001 | Nilsson | H04M 1/677 455/404.1 |
| 6,799,017 B1 | 9/2004 | Kregel | |
| 2005/0250493 A1 | 11/2005 | Elkarat et al. | |
| 2006/0246877 A1* | 11/2006 | Kashanian | H04W 4/16 455/412.2 |
| 2007/0105545 A1 | 5/2007 | Czeremuga et al. | |
| 2007/0190976 A1* | 8/2007 | Hoshino | G07C 9/00031 455/411 |

(Continued)

OTHER PUBLICATIONS

International Search Report (PCT/EP2010/060585) dated Apr. 4, 2011.

*Primary Examiner* — Tammy Paige Goddard
*Assistant Examiner* — Frantz Bataille
(74) *Attorney, Agent, or Firm* — Frommer Lawrence & Haug LLP

(57) ABSTRACT

A communication apparatus for providing an indication about a missed telephone call. The apparatus includes receiving means for receiving an incoming call, a control unit for processing said incoming call, and output means for outputting information to an user. The communication apparatus also includes processing means which extracts a cause value contained in a cause information element sent from a network to the communication apparatus, and which outputs to the user an indication related to a missed call via the output means. The cause value indicates whether the call was cleared by the calling user or by the network. The communication apparatus outputs to the user, via the output means, an indication related to whether the missed call was caused by the calling user or by the network.

13 Claims, 2 Drawing Sheets

(56) References Cited

U.S. PATENT DOCUMENTS

| | | | | |
|---|---|---|---|---|
| 2007/0280457 A1* | 12/2007 | Aberethy | .............. | H04M 1/575 379/201.01 |
| 2007/0280458 A1* | 12/2007 | Aberethy | .......... | H04M 3/42042 379/201.01 |
| 2009/0163178 A1* | 6/2009 | Kim | ........................ | H04M 1/56 455/412.1 |

* cited by examiner

COMMUNICATION APPARATUS FOR PROVIDING AN INDICATION ABOUT A MISSED CALL, AND METHOD THEREOF

The present application claims priority from PCT Patent Application No. PCT/EP2010/060585 filed on Jul. 21, 2010, the disclosure of which is incorporated herein by reference in its entirety.

FIELD OF THE INVENTION

The present invention relates to a communication apparatus for providing an indication about a missed call.

The present invention also relates to a method for providing an indication about a missed call.

It is noted that citation or identification of any document in this application is not an admission that such document is available as prior art to the present invention.

At the state of the art it is known that, when a first user (i.e. a calling user) performs a call to a second user (i.e. a called user) and the called user does not answer to the call, there are two different possibilities.

According to a first possibility, the calling user makes the phone of a coiled user ringing for a determined period of time and then activates closing means (for example, the usual red button of a mobile phone) apt to close the call; therefore, in this case the disconnection that determines the missed call on the phone of the called user is caused by the calling user (through the activation of said closing means).

According to a second possibility, after a particular period of time has expired, the call is disconnected automatically by the network. The expiration of the period of time is used by the network to prevent a waste utilization of the network resources during the connection setup among different communication apparatuses.

Communication apparatuses known at the state of the art only contain an indication that a missed call has been received by the called user; as a result, the called user is not in the position to recognize if the call has been ended after a small amount of time and/or of rings, or if said call has been ended after a considerable amount of time and/or of rings, or if said call has been ended through the disconnection executed by the network.

Therefore, since it is highly probable that a long duration ringing call (i.e. a missed call having a considerable amount of rings) has to be considered more important or urgent than a short duration ringing call (i.e. a missed call having a small amount of rings), the called user may not recognize the importance of a missed call.

Document EP1473912 relates to a mobile terminal for a wireless communication system, said terminal comprising an output means for outputting information to an user, a receiving means for receiving a call, a ring counter for counting the number of rings of an incoming call received by the receiving means and a call processing means for outputting via the output means information of an incoming call to a user according to the number of rings counted by the ring counter.

Document U.S. Pat. No. 4,751,729 relates to a telephone accessory for detecting and recording and optionally displaying the number of rings sounded by a telephone which is ringing is disclosed. The accessory includes detecting means to detect the sound of the rings of the telephone, counting means associated with the detecting means to count the number of rings sounded by the telephone; recording/storage means associated with the counting means to record/store the number of rings counted; and optionally display means associated with the recording/storing means to display the number of rings recorded/stored. Therefore, a telephone accessory according to document U.S. Pat. No. 4,751,729 is able to detect ringing of a telephone and to provide through a visual display a record of the number of times the telephone has been permitted to ring during each telephone call.

Therefore, documents EP1473912 and U.S. Pat. No. 4,751,729 disclose to count the number of rings of a missed call, in particular for detecting the importance of said missed call.

However, both the solutions disclosed in documents EP1473912 and U.S. Pat. No. 4,751,729 do not provide a reliable indication about the cause of the disconnection of the missed call, since they do not contain any indication regarding the cause of the disconnection, in particular if the disconnection was caused by the calling user or by the network. In fact, said solutions only provide the number of rings executed before the disconnection occurred.

Moreover, said solutions are apt only to furnish an aleatory indication of the number of rings executed before the disconnection occurred, since not always the number of time the communication apparatus rings is the same for the calling user and for the called user.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

In this frame, it is the main object of the present invention to overcome the drawbacks of the solutions known at the state of the art.

These objects are achieved by the present invention through an apparatus and a method for providing an indication about a missed call, incorporating the features set out in the appended claims, which are intended as an integral part of the present description.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
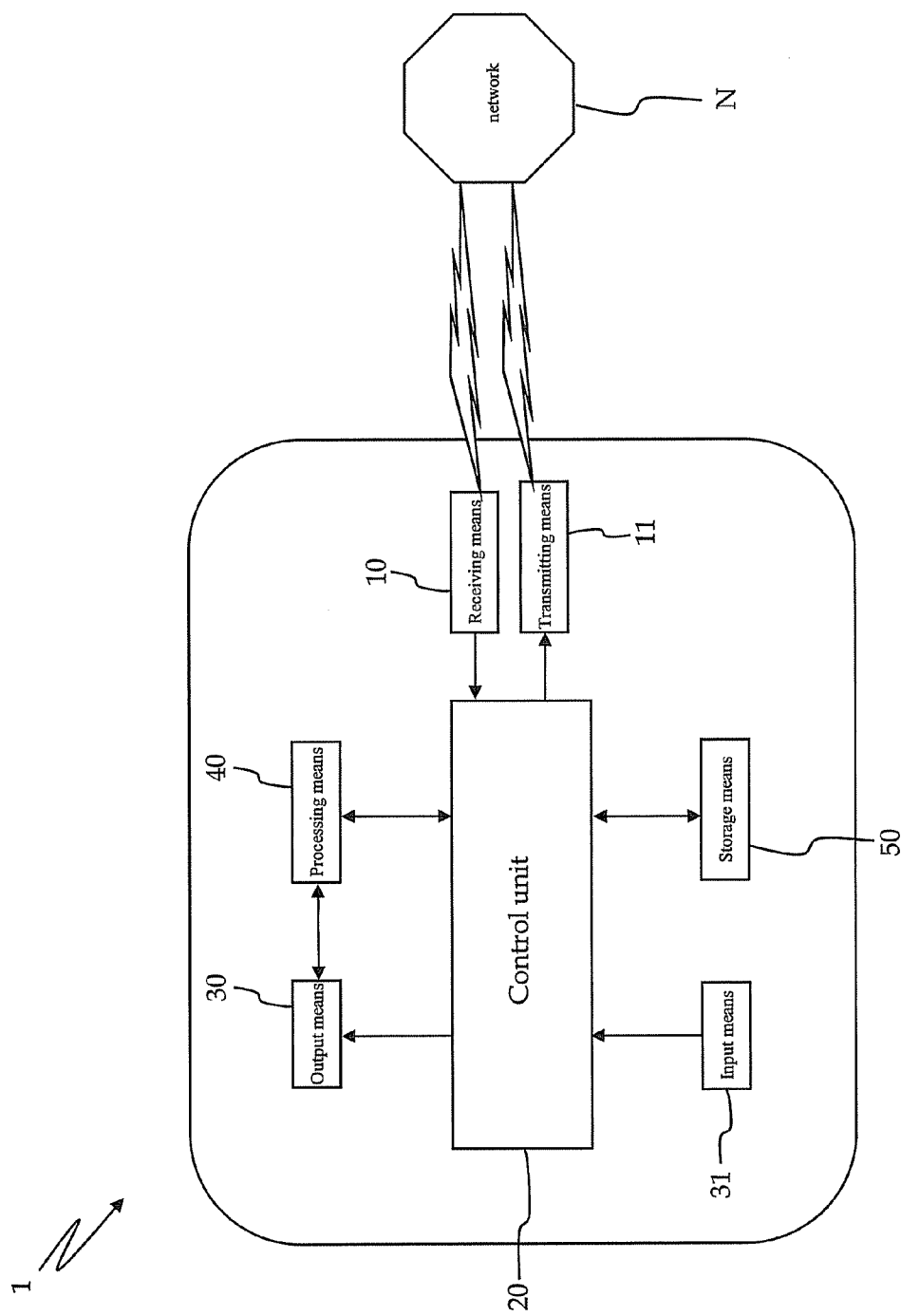
FIG. 1 is a block diagram of an apparatus for providing an indication about a missed call according to the present invention.

In FIG. 1, reference numeral 1 designates as a whole a communication apparatus for providing an indication about a missed call according to the present invention.

Preferably, the communication apparatus 1 according to the exemplary embodiment of the present invention comprises a mobile phone; however, it is clear that said apparatus 1 can also comprise a fixed phone.

As it is clearly represented in FIG. 1, the communication apparatus 1 is connected to at least a network N; however it is clear that, for properly establishing and handling a communication connection between the apparatus 1 and a second apparatus (not shown in attached drawings) can be involved one network N or a plurality of networks N (for example, a first network N connected to the apparatus 1 and a second network connected to a second apparatus).

The apparatus 1 comprises receiving means 10 for receiving an incoming call. Moreover, the apparatus 1 comprises transmitting means 11 for transmitting an outgoing call; said receiving means 10 and transmitting means 11 may be an unique antenna, or the like.

The apparatus 1 comprises a control unit 20 for processing said incoming call and output means 30 for outputting information to an user. In particular, said output means 30 comprise a display; however, it is clear that said output means 30 may be a loudspeaker, a speaker or similar means apt to output information to an user.

Preferably, the apparatus 1 also comprise input means 31 for enabling the user to input data and/or information; in particular, said input means 31 may comprise a keypad, a touchpad, speech recognition means, a microphone, and the like.

According to the present invention, said apparatus 1 comprises processing means 40 associated to said control unit 20 for extracting a cause value contained in a cause information element sent from a network N to said communication apparatus 1 and for outputting to the user an indication related to a missed call via the output means 30.

As known, various organizations [such as the $3^{rd}$ Generation Partnership Project (3GPP), the International Telecommunication Union (ITU), the $3^{rd}$ Generation Partnership Project 2 (3GPP2), Internet Engineering Task Force (IETF), and the like] have established standardized procedures for telecommunication network and multiple access environments, said standardized procedures being established between a calling apparatus and a network and between the network and a called apparatus.

For example, call control procedures are defined in the ITU-T recommendation Q.931 regarding the Integrated Services Digital Network (ISDN) or in the 3GPP TS 24.008 regarding the Universal Mobile Telecommunications System (UMTS), the Global System for Mobile Communications (GSM), the General Packet Radio System (GPRS) and the Long Term Evolution (LEE).

According to said standards, various messages are exchanged between calling apparatus, a network and a called apparatus. In particular, when an apparatus or the network wants to close the call, a DISCONNECT and RELEASE sequence is performed, the CC DISCONNECT message is sent containing a mandatory element called "cause information element" that comprises a "cause value" apt to categorize the cause of the disconnection.

Said "cause information element" in the messages is exchanged between a calling apparatus, a network and a called apparatus, and it is used by network operators only to retrieve statistical analysis of the phone traffic.

According to the present invention, the processing means 40 advantageously extract a cause value contained in a cause information element sent from a network N to said apparatus 1 and outputs to the user an indication related to a missed call, in particular via said output means 30.

In particular, said processing means 40 extract a cause value indicating that the missed call was caused by the network N and outputs to the user via said output means 30 an indication that the missed call was caused by the network N. Preferably, in this case said cause value indicates "RECOVERY ON TIME EXPIRY" or "NORMAL, UNSPECIFIED".

In fact, as said before, after a particular period of time has expired the call is disconnected automatically by the network. In this case, the expiration of the period of time is set by the network N and is used by the network N to prevent a waste utilization of the network resources during the connection setup among communication apparatuses.

The fact that the missed call was caused by the network N for the expiration of the period of time set by the network N indicates to the called user that the missed call was important or urgent; in fact, the calling user has not caused the end of the call but, on the contrary, he has continued to make the phone of the called user ringing till the expiration of the period of time set by the network N.

Therefore, in a preferred embodiment, said processing means 40 associate a high indication of urgency, such as a particular image or the like, to said cause value indicating "RECOVERY ON TIME EXPIRY" or "NORMAL, UNSPECIFIED".

On the contrary, said processing means 40 extract a cause value indicating that the call was cleared normally and outputs to the called user via said output means 30 an indication that the missed call was caused by the calling user. Preferably, in this case said cause value indicates "NORMAL CLEARING".

The fact that that the missed call was caused by the calling user indicates to the called user that the missed call was not important or urgent.

Therefore, in a preferred embodiment, said processing means 40 associate to said cause value indicating "NORMAL CLEARING" an indication of non-urgency.

Moreover, the communication apparatus 1 may further comprise storage means 50 for storing at least one telephone number, in order to associate an incoming urgent missed call to a particular user.

Figure 2:
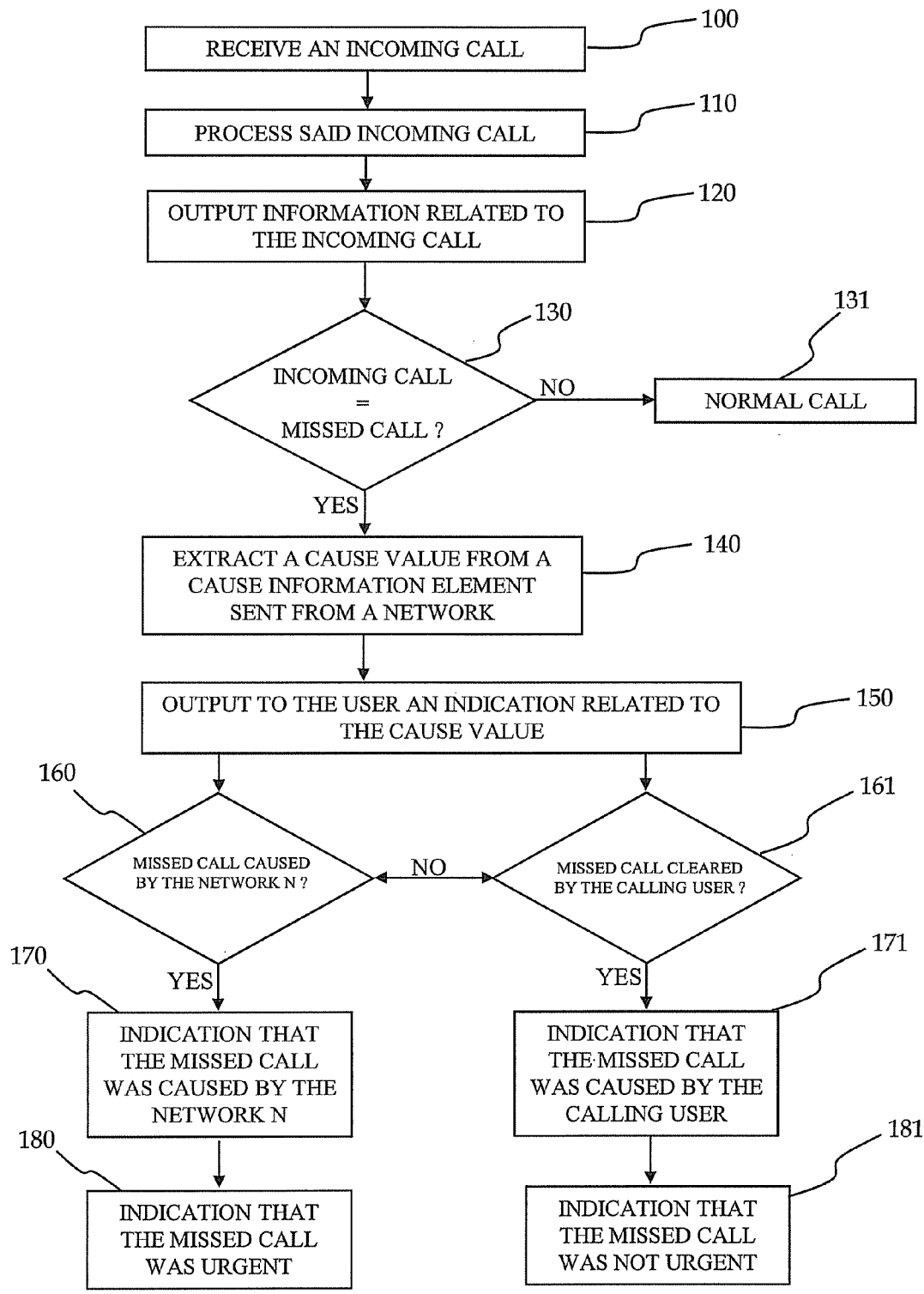
FIG. 2 is a block diagram illustrating a method for providing an indication about a missed call according to the present invention.

FIG. 2 relates to a method for providing an indication about a missed call according to the present invention.

In particular, said method comprises the following steps:
receiving an incoming call by means of a communication apparatus 1 comprising receiving means 10 (step 100);
processing said incoming call by means of a control unit 20 coupled to said receiving means 10 (step 110);
outputting information related to the incoming call to an user by means of output means 30 (step 120);

According to the present invention, said method is characterized by the fact that said step of outputting information (step 120) is performed by processing means 40 associated to said control unit 20, said processing means 40 performing the steps of verifying if the incoming call is a missed call (step 130);

extracting a cause value from a cause information element sent from a network N to said apparatus 1 (step 140), and outputting to the user an indication related to the cause value via the output means 30 (step 150).

It is clear that, according to the present invention, the previous steps 130, 140 and 150 may be performed in a different order than in the one described.

In the case the user decides to respond to the incoming call, said incoming call cannot be considered a missed call and a normal call is performed (step 131); in particular, in this case the communication apparatus 1 may perform a step (not shown in FIG. 2) of activating an audio system 40 through which a voice signal is inputted/outputted.

Said step of outputting to the user an indication related to the cause value (step 150) is performed through the steps of:

verifying if the cause value comprises an indication that the missed call was caused by the network (N) (step 160), and outputting to the user, via said output means 30, an indication that the missed call was caused by the network N (step 170).

In this case, said step of verifying if the cause value comprises an indication that the missed call was caused by the network N (step 160) is performed through the verification that the cause value indicates "RECOVERY ON TIME EXPIRY" or "NORMAL, UNSPECIFIED".

Moreover, said step of outputting an indication that the missed call was caused by the network N (step 170) may be performed by means of the step of outputting to the user via said output means 30 an indication of urgency related to the missed call (step 180).

On the contrary, if the communication apparatus 1 verifies that the incoming call is not a missed call caused by the network N, said step of outputting to the user an indication related to the cause value (step 150) is performed through the steps of:

verifying if the cause value comprises an indication that the missed call was cleared by the calling user indicates "NORMAL CLEARING" (step 161), and outputting to the user via said output means 30 an indication that the missed call was caused by the calling user (step 171).

In this case, said step of verifying if the cause value comprises an indication that the missed call was cleared by the calling user (step 161) is performed through the verification that the cause value indicates "NORMAL CLEARING".

Moreover, said step of outputting an indication that the missed call was caused by the calling user (step 171) may be performed by means of the step of outputting to the user, via said output means 30, an indication of non-urgency related to the missed call (step 181).

The advantages offered by an apparatus and a method for providing an indication about a missed call according to the present invention are apparent from the above description.

In particular, such advantages are due to the fact that the provision of processing means 40 that extract a cause value from a cause information element sent from a network N allows to provide a communication apparatus and a method conceived in a manner to be apt to provide a reliable indication about the cause of the disconnection of the missed call.

In particular, the provision of said processing means 40 allows to provide an indication regarding the fact that the disconnection of the missed call was caused by the calling user or by the network; as a consequence, the called user can have a precise indication regarding the urgency of said missed call, in particular via said output means 30.

In addition the provision of storing the phone number of a particular user doing the urgent missed call can be useful in case of missing call coming from a relative.

The apparatus and method described herein by way of example may be subject to many possible variations without departing from the novelty spirit of the inventive idea; it is also clear that in the practical implementation of the invention the illustrated details may have different devices or be replaced with other technically equivalent elements, as well as providing different sequences of steps.

It can therefore be easily understood that the present invention is not limited to the above-described apparatus and method, but may be subject to many modifications, improvements or replacements of equivalent parts and elements without departing from the inventive idea, as clearly specified in the following claims.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A communication apparatus for providing an indication about a missed telephone call, said apparatus comprising:

receiving means for receiving an incoming call;

control unit configured to process said received incoming call that is received by the communication apparatus;

output means for outputting information to a user of the communication apparatus; and processing means for extracting a cause value contained in a cause information element sent from a network to said communication apparatus, and for outputting to the user, via the output means, an indication related to a missed received incoming call that is received by the communication apparatus but is not answered by the user of the communication apparatus; and wherein, when a caller ends the received incoming call, said cause value indicates that the received incoming call was cleared by the caller, and the communication apparatus outputs to the user via said output means an indication that the missed received incoming call was caused by the caller; and wherein, when the network automatically ends the received incoming call, said cause value consequently indicates that the received incoming call was cleared by the network, and the communication apparatus consequently outputs to the user via said output means an indication that the missed received incoming call was caused by the network and was urgent.

2. The communication apparatus according to claim 1; wherein, when said processing means extract a cause value indicating that the missed received incoming call was caused by the network, said processing means output to the user an indication that the missed received incoming call was caused by the network.

3. The communication apparatus according to claim 1; wherein said cause value indicates "RECOVERY ON TIME EXPIRY" or "NORMAL, UNSPECIFIED".

4. The communication apparatus according to claim 1;
wherein said cause value indicates "NORMAL CLEARING".

5. The communication apparatus according to claim 1;
wherein said output means output to the user an indication that the missed received incoming call was not urgent, as a consequence of having received a cause value indicating that the call was cleared normally.

6. The communication apparatus according to claim 1;
wherein said communication apparatus comprises a mobile phone.

7. The communication apparatus according to claim 1;
wherein said communication apparatus comprises transmitting means for transmitting an outgoing call.

8. The communication apparatus according to claim 1;
wherein said communication apparatus comprises input means for enabling the user to input data and/or information.

9. The communication apparatus (1) according to claim 1;
wherein said communication apparatus comprises storage means for storing at least one telephone number, in order to associate an incoming urgent missed call to a particular user.

10. A method for providing an indication about a missed call, said method comprising the following steps:
receiving an incoming call by means of a communication apparatus comprising receiving means;
processing said received incoming call by means of a control unit coupled to said receiving means;
outputting, by means of an output means, information related to the received incoming call to a user of the communication apparatus;
wherein said step of outputting information is performed by cause processing means associated to said control unit, said cause processing means performing the steps of:
verifying if the received incoming call is a missed received incoming call that was received by the communication apparatus but was not answered by the user of the communication apparatus;
extracting a cause value from a cause information element sent from a network to said apparatus; and
outputting to the user an indication related to the cause value via the output means;
wherein said step of outputting to the user an indication related to the cause value is performed through the steps of:
verifying when the cause value comprises an indication that the missed received incoming call was automatically caused by the network, and in such a case consequently outputting to the user via said output means said indication that the missed received incoming call was ended by the network and was urgent; and
verifying when the cause value comprises an indication that the missed received incoming call was cleared by the caller, and in such a case outputting to the user via said output means an indication that the missed received incoming call was ended by the caller.

11. The method according to claim 10;
wherein said step of verifying if the cause value comprises an indication that the missed received incoming call was caused by the network is performed through a verification that the cause value indicates "RECOVERY ON TIME EXPIRY" or "NORMAL, UNSPECIFIED".

12. The method according to claim 10;
wherein said step of verifying if the cause value comprises an indication that the missed received incoming call was cleared by the caller is performed through a verification that the cause value indicates "NORMAL CLEARING".

13. The method according to claim 10;
wherein said step of outputting an indication that the missed received incoming call was caused by the caller is performed by means of a step of outputting to the user via said output means an indication of non-urgency related to the missed received incoming call.

* * * * *